(12) United States Patent
Nilsson

(10) Patent No.: US 9,254,800 B2
(45) Date of Patent: Feb. 9, 2016

(54) BUMPER BEAM WITH MOUNTING PLATES

(71) Applicant: Gestamp Hardtech AB, Lulea (SE)

(72) Inventor: Johan Nilsson, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 14/770,549

(22) PCT Filed: Mar. 5, 2014

(86) PCT No.: PCT/SE2014/050271
§ 371 (c)(1),
(2) Date: Aug. 26, 2015

(87) PCT Pub. No.: WO2014/142734
PCT Pub. Date: Sep. 18, 2014

(65) Prior Publication Data
US 2016/0001724 A1    Jan. 7, 2016

(30) Foreign Application Priority Data
Mar. 13, 2013    (SE) ...................................... 1300188

(51) Int. Cl.
*B60R 19/24*    (2006.01)
*B60R 19/18*    (2006.01)

(52) U.S. Cl.
CPC .......... *B60R 19/24* (2013.01); *B60R 2019/1806* (2013.01); *B60R 2019/242* (2013.01); *B60R 2019/247* (2013.01)

(58) Field of Classification Search
CPC ..................... B60R 19/024; B60R 2019/1806; B60R 2019/242; B60R 2019/247
USPC .................................................. 293/154, 133
See application file for complete search history.

(56) References Cited

U.S. PATENT DOCUMENTS 5,441,319 A    8/1995    Oyama et al.
5,829,805 A    11/1998    Watson

FOREIGN PATENT DOCUMENTS

JP    2004025921    1/2004
WO    WO 2008/147276    12/2008

*Primary Examiner* — Pinel Romain
(74) *Attorney, Agent, or Firm* — Mark P. Stone

(57) ABSTRACT

A bumper beam has a U-profile with its top directed toward the vehicle. It has fixedly welded mounting plates (16, 17) in the form of horizontal hat-shaped profiles. The mounting plates are bolted to end plates (19) on the side rails (18) of the vehicle, so that collision stresses are transferred to all four sides (29, 30, 32, 33) of the respective side rail.

5 Claims, 3 Drawing Sheets

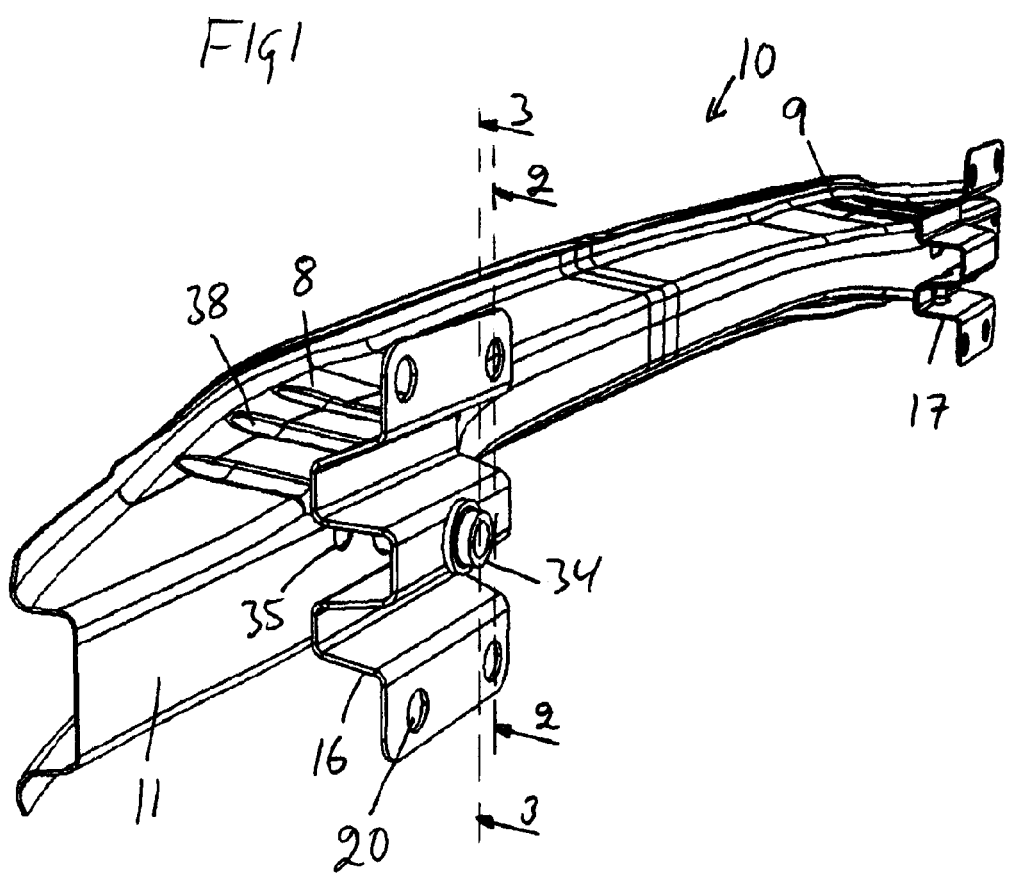

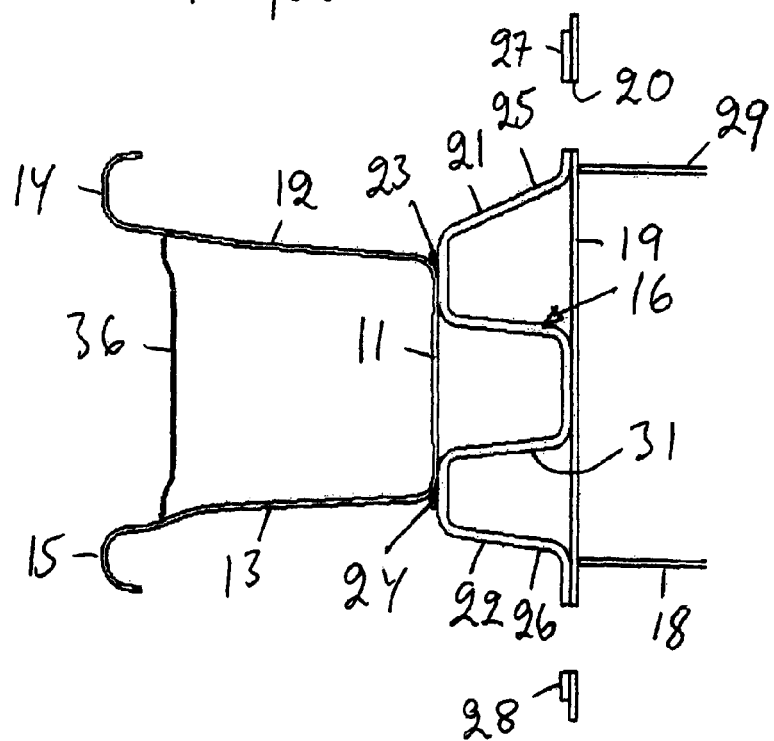
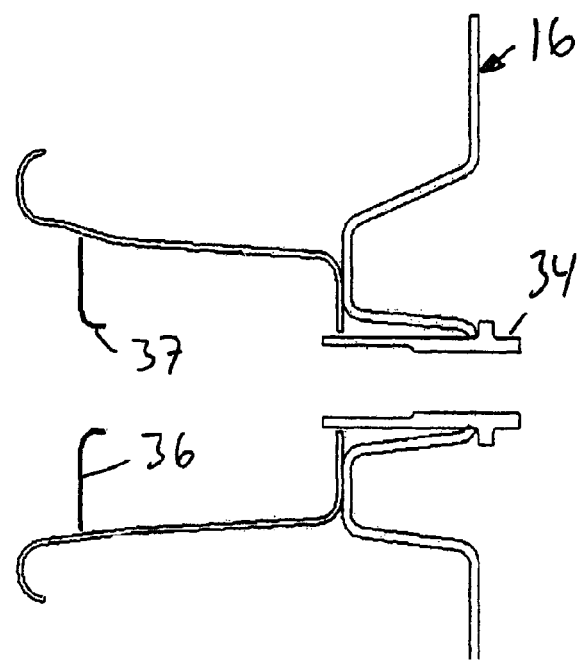

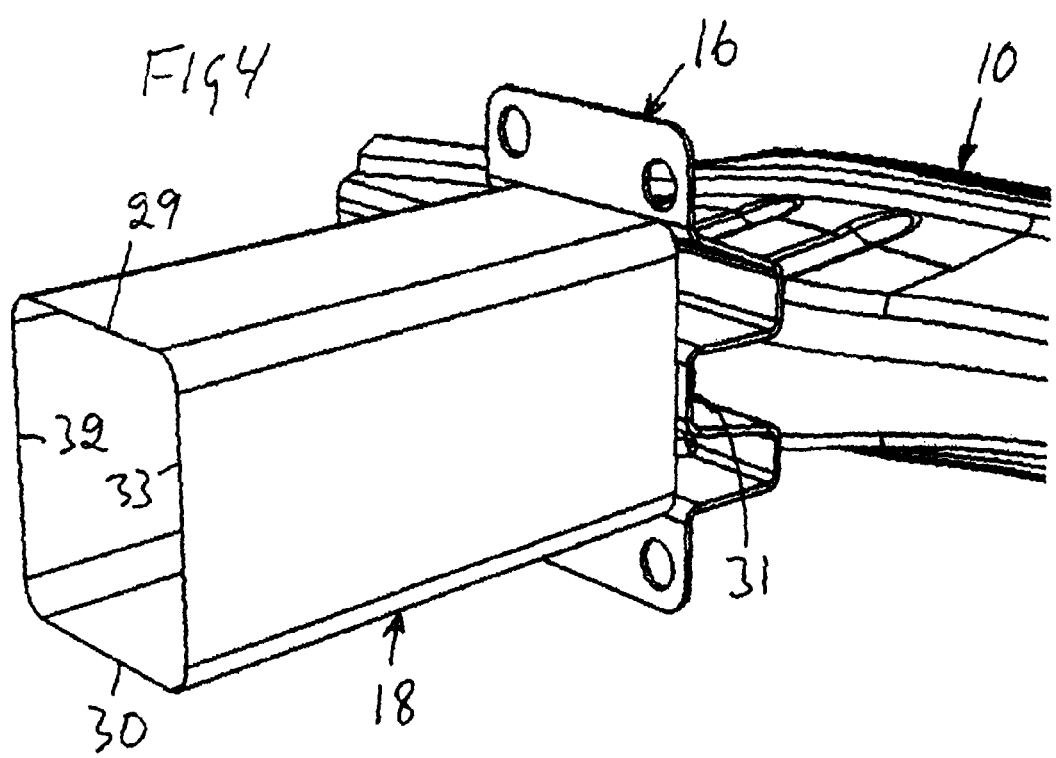

BUMPER BEAM WITH MOUNTING PLATES

AREA OF TECHNOLOGY OF THE INVENTION

The invention relates to a bumper beam for a vehicle, having a U-profile with its top directed in toward the vehicle, and having fastening portions which have mounting plates welded onto them for bolting to end plates on the side rails of the vehicle.

BACKGROUND OF THE INVENTION

WO 2008/147276 shows a bumper beam with a hat-shaped profile which has its top directed toward the vehicle and which has mounting plates welded to the bumper beam and bolted to the vehicle. The mounting plates are used when the bumper beam is intended to absorb energy through plastic deformation when under collision stress and when the mounting plates do not have to absorb so much energy but are primarily intended to transfer force to the side rails of the vehicle.

OBJECT OF THE INVENTION

The object of the invention is to improve the transmission of collision forces to the side rails.

BRIEF DESCRIPTION OF THE INVENTION

Each mounting plate has a horizontal central U-profile with a central flange which is supported against the end plate of the side rail, and a U-profile on each side of the central flange of the central U-profile, which U-profiles are supported against the bumper beam and are welded to it and have sides which end against the end plate where the end plate is supported against the upper edge of the side rail, which sides merge into side flanges with bolt holes for engaging and bolting to the end plate. The mounting plate is wider than the side rail.

With this configuration, the mounting plate can effectively transmit collision forces both to the side edges of the side rail and to the upper and lower edges of the side rail.

The invention is defined by the patent claims.

BRIEF DESCRIPTION OF THE DRAWINGS

FIG. 1 is an isometric view of a bumper beam which is an exemplary embodiment of the invention;

FIG. 2 is a cross section through the line 2-2 in FIG. 1, also showing the end of a side rail;

FIG. 3 is a cross section through the line 3-3 in FIG. 1; and

FIG. 4 is a detail of the bumper beam of FIG. 1, also showing the end of a side rail.

DESCRIPTION OF THE ILLUSTRATED PREFERRED EMBODIMENT OF THE INVENTION

FIG. 1 illustrates a bumper beam 10 with a hat-shaped profile, i.e. generally a U-profile, with its top directed toward the vehicle. As is apparent from FIGS. 2 and 3, the hat-shaped profile has a central flange 11 and two sides 12 and 13 which end in side flanges 14 and 15, which flanges may have back-turned parts, as shown.

The bumper beam has two fastening portions 8 and 9 with similar mounting plates 16 and 17 whereby the bumper beam is mounted to the side rails of the vehicle. FIG. 2 shows the end of a side rail 18 with a rectangular cross section, which has an end plate 19. The end plate and the mounting plate 16 have corresponding holes 20 for bolting whereby the mounting plate can be fixedly bolted to the end plate.

The mounting plate 16 is bent so that it has two horizontal U-profiles 21 and 22, which are welded to the central flange of the bumper beam at 23 and 24 at the edges of said flange 11, and the mounting plate has sides 25 and 26 which end in side flanges 27 and 28 which are disposed against the end plate 19 in the region where the edges of the horizontal sides 29 and 30 are welded to the end plate. The side flanges 27 and 28 of the U-profiles 21 and 22 rest against the end plate 19 and have bolt holes 20. A central U-profile 31 is formed between these U-profiles 21 and 22, which U-profile 31 is supported against the end plate 19 of the side rail.

FIG. 4 shows the side rail 18, but its end plate 19 has been omitted in the figure, for the sake of illustration. It is seen that the mounting plate 16 is broader than the rectangular side rail, so that the edges of the vertical sides 32 and 33 of the side rail are supported against the central U-profile 31 of the mounting plate. When collision stresses are experienced, thus all four sides 29, 30, 32, and 33 of the side rail are directly exposed to the forces.

Often, one side of a bumper beam has a bushing intended to receive a threaded towing eye. FIG. 1 shows such a threaded bushing 34. The bushing is welded to the mounting plate 16 and extends into a hole 35 in the central flange of the bumper beam, so that it is supported laterally. FIGS. 2 and 3 show a cover 36 which is recessed in the hat-shaped profile and is welded to the sides of the hat-shaped profile in the interior of said hat-shaped profile, so that the hat-shaped profile has a closed profile.

The cover covers the hat-shaped profile at and between the fastening portions 8 and 9. The cover 36 has a hole 37 for throughgoing passage of a towing eye. The cover reinforces the hat-shaped profile. For reinforcement purposes, the cover may have vertical depressions at the fastening portions, and may have elongated depressions between them (not shown).

At the fastening portions 8 and 9, the sides 12 and 13 of the hat-shaped profile have depressions 38 directed in the longitudinal direction of the vehicle, for the purpose of reinforcing the hat-shaped profile at said fastening portions.

The invention claimed is:

1. A bumper beam for a vehicle, having a U-profile with its top directed toward the vehicle, and having fastening portions (8, 9) with mounting plates (16, 17) welded to the fastening portions, the mounting plates being bolted to end plates (19) on the side rails (18) of the vehicle;

wherein:

against each side rail (18), the mounting plate (16, 17) has a horizontal central U-profile (31), the top of which takes support against the end plate of the side rail, and a U-profile (2, 22) on each side of the central U-profile, which have their tops abutting the bumper beam and welded to the bumper beam and have sides (25, 26) that end against the end plate (19) where the end plate is supported by the edges of the side rail (18) and undergo a transition to side flanges (27, 28) with bolt holes (20) for engaging with and bolting to the end plate, the mounting plate being horizontally broader than the side rail.

2. A bumper beam according to claim 1, wherein the U-profile of the bumper beam is a hat-shaped profile with a central flange (11), to which the mounting plate (16) is welded, and two sides which end with side flanges (14, 15).

3. A bumper beam according to claim 1, wherein the U-profile of the bumper beam is a hat-shaped profile, and the sides (12, 13) of the hat-shaped profile have depressions (38) at the fastening portions (8, 9), which depressions extend in the longitudinal direction of the vehicle.

4. A bumper beam according to claim 2, wherein the hat-shaped profile has a cover (36) which gives it a closed profile.

5. A bumper beam according to claim 3, wherein the hat-shaped profile has a cover (36) which gives it a closed profile.

\* \* \* \* \*